United States Patent [19]

Cole et al.

[11] Patent Number: 5,573,707
[45] Date of Patent: Nov. 12, 1996

[54] PROCESS FOR REDUCING FOAM IN AN AQUEOUS ALKYL POLYGLYCOSIDE COMPOSITION

[75] Inventors: Howard Cole; Kristina W. Erler, both of Charlotte, N.C.; Kenneth L. Smith, Fort Mill, S.C.; Brian C. Francois, Charlotte, N.C.; Billy W. Noble, Greenville, S.C.; Stephen F. Gross, Hatfield, Pa.

[73] Assignee: Henkel Corporation, Plymouth Meeting, Pa.

[21] Appl. No.: 378,153

[22] Filed: Jan. 25, 1995

Related U.S. Application Data

[63] Continuation-in-part of Ser. No. 337,589, Nov. 10, 1994.
[51] Int. Cl.[6] ................................................ C11D 1/722
[52] U.S. Cl. .......................... 252/321; 252/358; 8/137; 510/303
[58] Field of Search ........................ 8/137, 139; 252/8.6, 252/8.8, 8.9, 174.17, 174.21, 174.22, 544, 548, 321, 358

[56] References Cited

U.S. PATENT DOCUMENTS 5,047,168  9/1991  Broze et al. .................. 252/174.17

Primary Examiner—Prince Willis, Jr.
Assistant Examiner—Alan D. Diamond
Attorney, Agent, or Firm—Ernest G. Szoke; Wayne C. Jaeschke; Real J. Grandmaison

[57] ABSTRACT

The present invention provides a process for reducing foam in an aqueous alkyl polyglycoside composition comprising adding an effective amount of an ethylene oxide-propylene oxide copolymer of the formula II $$R^1[(EO)_b(PO)_c(EO)_d(PO)_f]_p \qquad (II)$$

wherein $R^1$ is an ethylenepolyamino group of the formula $$-NH-(CH_2CH_2-N)_k^{\phantom{|}}CH_2CH_2-NH-$$
$$\phantom{-NH-(CH_2CH_2-N)_k}|$$

and wherein each of b and f is 0 or a number having a value of at least 1, and each of c and d is a number having a value of at least 1, with the proviso that when f is 0, b is at least 1 and when b is 0, f is at least 1; p is an integer from 2 to 5; and k is an integer from 0 to 3 and EO is $-CH_2CH_2O-$ and PO is $-CH_2CH(CH_3)-O-$.

3 Claims, 9 Drawing Sheets

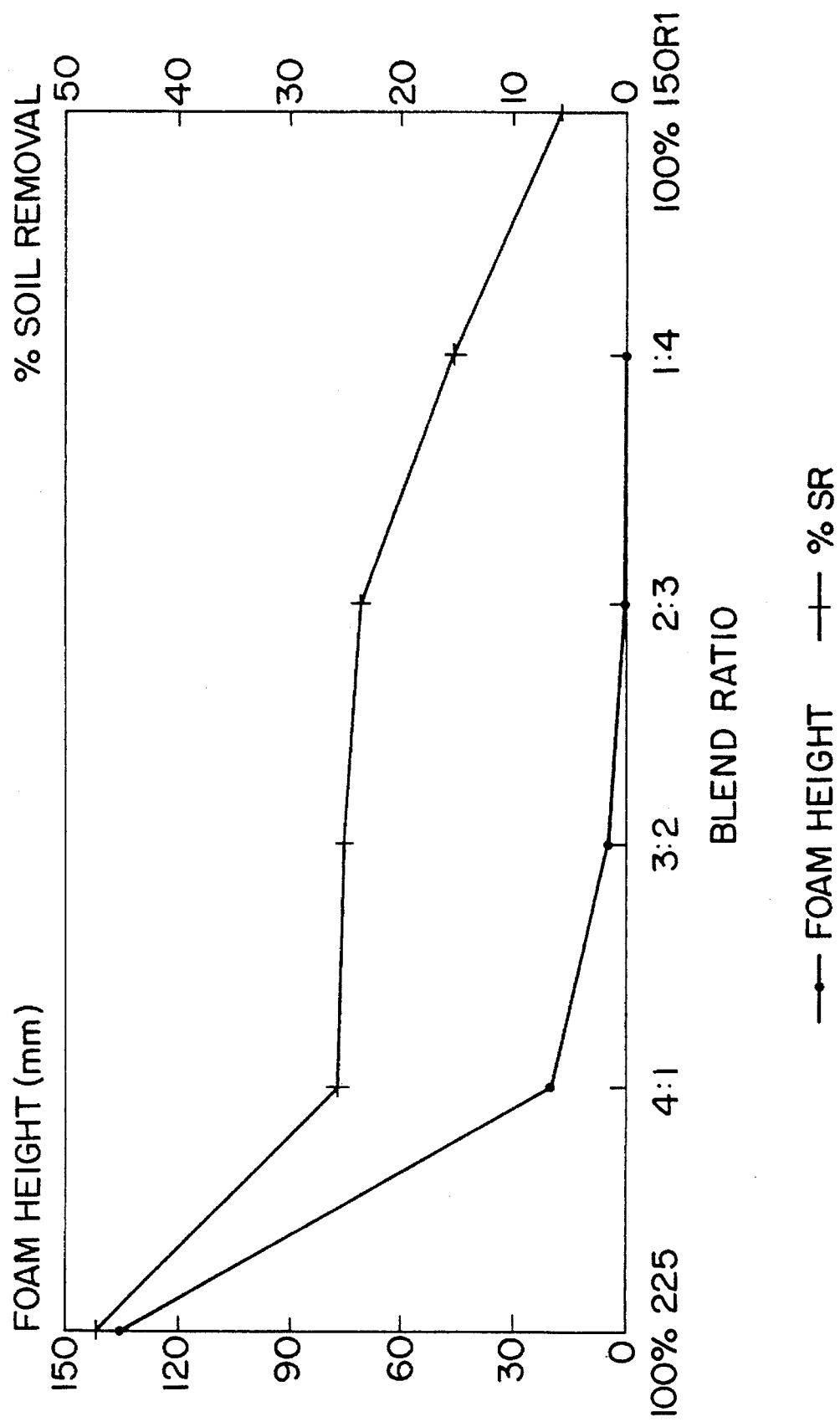

PROCESS FOR REDUCING FOAM IN AN AQUEOUS ALKYL POLYGLYCOSIDE COMPOSITION

CROSS-REFERENCE TO RELATED APPLICATIONS

This application is a continuation-in-part of application Ser. No. 08/337,589, filed on Nov. 10, 1994, the entire contents of which are incorporated herein by reference.

BACKGROUND OF THE INVENTION

1. Field of the Invention

The present invention generally relates to a process for scouring and bleaching textile materials and to a process for reducing foam in an aqueous alkyl polyglycoside composition.

2. Statement of the Related Art

Textile materials are among the most ubiquitous in society. They provide shelter and protection from the environment in the form of apparel, and comfort and decoration in the form of household textiles, such as sheets, upholstery, carpeting, drapery and wall covering, and they have a variety of industrial functions, such as tire reinforcement, tenting, filter media, conveyor belts, insulation, etc.

Textile materials are produced from fibers (finite lengths) and filaments (continuous lengths) by a variety of processes to form woven, knitted and nonwoven (felt-like) fabrics. In the case of woven and knitted fabrics, the fibers and filaments are formed into intermediate continuous-length structures known as yarns, which are interlaced by weaving or interlooped by knitting into planar-flexible sheetlike structures known as fabrics. Nonwoven fabrics are formed directly from fibers and filaments by chemically or physically bonding or interlocking fibers that have been arranged in a planar configuration.

Textile fibers are classified into two main categories, man-made and natural. Man-made fibers are formed by extrusion processes known as melt-dry, or wet spinning. The spinning or extrusion of filaments is normally followed by an operation known as drawing. In this step, the newly formed filaments are irreversibly extended and stabilized by setting or crystallization processes.

With the exception of silk, naturally occurring fibers have finite lengths and generally require several cleaning and purification steps prior to processing into yarns and fabrics.

There are a number of finishing process as that textile fibers are subjected to after their formation. The two with which the present invention is mostly concerned are scouring and bleaching. Scouring refers to the removal of sizing materials, lubricants and other impurities which are contained in and/or adhere to the fibers during their formation. These various impurities must be removed so that the textile fibers may be further processed. Another finishing process is bleaching whereby a white color is imparted to the fabric. This bleaching step also enhances the absorbency of the fiber materials in preparation for the application of other finishing processes as well as the removal of any residual impurities left over from the scouring process.

Both the scouring and bleaching processes are performed under extremely alkaline conditions using high concentrations of peroxide and/or caustic soda, and at high temperatures. Due to the extremely hot and alkaline environment, there is a need for a textile scouring and bleaching composition which is stable under these circumstances, while at the same time having low levels of foam formation under high agitation. Moreover, as a result of the current degree of enhanced consciousness with respect to the protection of our environment, the composition employed should be highly biodegradable as well. Thus, it is an object of this invention to provide a more effective means of scouring and bleaching textile fibers in an environmentally safe manner.

Another aspect of the present invention is reduction in the foam associated with the use of alkyl polyglycoside surfactants. It is known that alkyl polyglycosides exhibit significantly higher foaming profiles than other nonionic surfactants such as alcohol ethoxylates. In fact, it can be said that the foaming tendencies of alkyl polylgycosides more closely resemble those of anionic surfactants such as alcohol sulfates than the foaming tendencies of other nonionic surfactants. The higher foaming tendency of alkyl polyglycosides makes their use in certain types of applications disadvantageous. For example, public transportation vehicles are normally cleaned by spray washing with aqueous cleaning compositions applied from high pressure nozzles. Since such high pressure applications can produce significant amounts of foam, the surfactant used in these cleaning operations must have a minimum foaming tendency. Foaming problems can also arise when high foaming surfactants are used with floor cleaning machines. Consequently, users of alkyl polyglycosides are always looking for methods of decreasing the foaming tendency of aqueous alkyl polyglycoside compositions without simultaneously affecting the beneficial properties of the alkyl polyglycosides such as cleaning ability. It is, therefore, another object of the present invention to reduce the foaming tendency of aqueous alkyl polyglycoside compositions.

SUMMARY OF THE INVENTION

Other than in the operating examples, or where otherwise indicated, all numbers expressing quantities of ingredients or reaction conditions used herein are to be understood as modified in all instances by the term "about".

One aspect of the present invention is directed to a process for scouring and bleaching textile materials comprising adding to an aqueous peroxide bleaching bath an effective amount of a scouring and bleaching surfactant composition comprising:

(a) from about 6.0 to about 94.0% by weight of an alkyl polyglycoside having the general formula I

wherein R is a monovalent organic radical having from about 8 to about 16 carbon atoms; Z is a saccharide residue having 5 or 6 carbon atoms; and a is a number having a value from about 1 to about 6, (b) from about 94.0 to about 6.0% by weight of a synthetic alkoxylated $C_8$–$C_{15}$ linear alcohol, and (c) the remainder water, all weights being based on the weight of the composition, and then contacting said textile materials with said bath.

Another aspect of the present invention is directed to a process for reducing foam in an aqueous alkyl polyglycoside composition which comprises adding to the composition an effective amount of an ethylene oxide-propylene oxide copolymer of the formula II

or formula III $$R^2(EO)_b(PO)_c(EO)_d(PO)_fH \quad (III)$$

or a combination thereof, wherein $R^1$ is an ethylenepolyamino group of the formula $$-NH-(CH_2CH_2-N)_{\overline{k}}CH_2CH_2-NH-$$

and $R^2$ is a $C_8$–$C_{15}$ alkyl group and wherein each of b,c,d, and f is 0 or a number having a value of at least 1 with the proviso that when f is 0, each of b,c, and d is at least 1 and when b is 0, each of c, d, and f is at least 1; p is an integer from 2 to 5; k is an integer from 0 to 3; and EO is —$CH_2CH_2$—O— and PO is —$CH_2$ $CH(CH_3)$—O—.

BRIEF DESCRIPTION OF THE DRAWINGS

FIG. 9 is a graph of Ross-Miles foam height and % soil removal versus time for various weight ratios of APG® 225 surfactant and TETRONIC® 150R1 surfactant.

DESCRIPTION OF THE INVENTION

Figure 1:
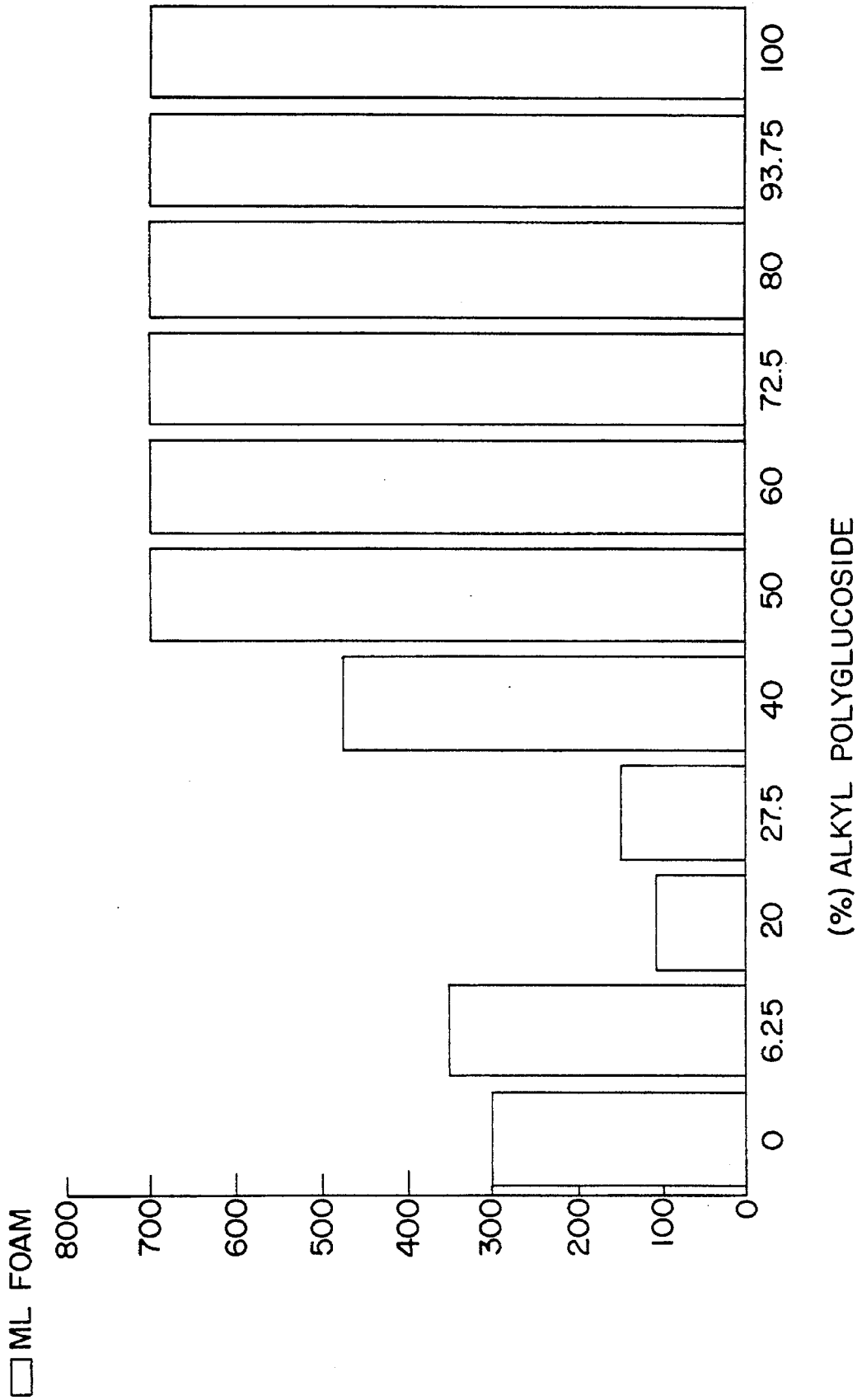
FIG. 1 is a bar graph illustrating the degree of foam generated by various blends of APG® 600 AND TRYLON® 6735, by measuring the height of foam formed after 2 minutes, at a temperature of about 120° F.
Figure 2:
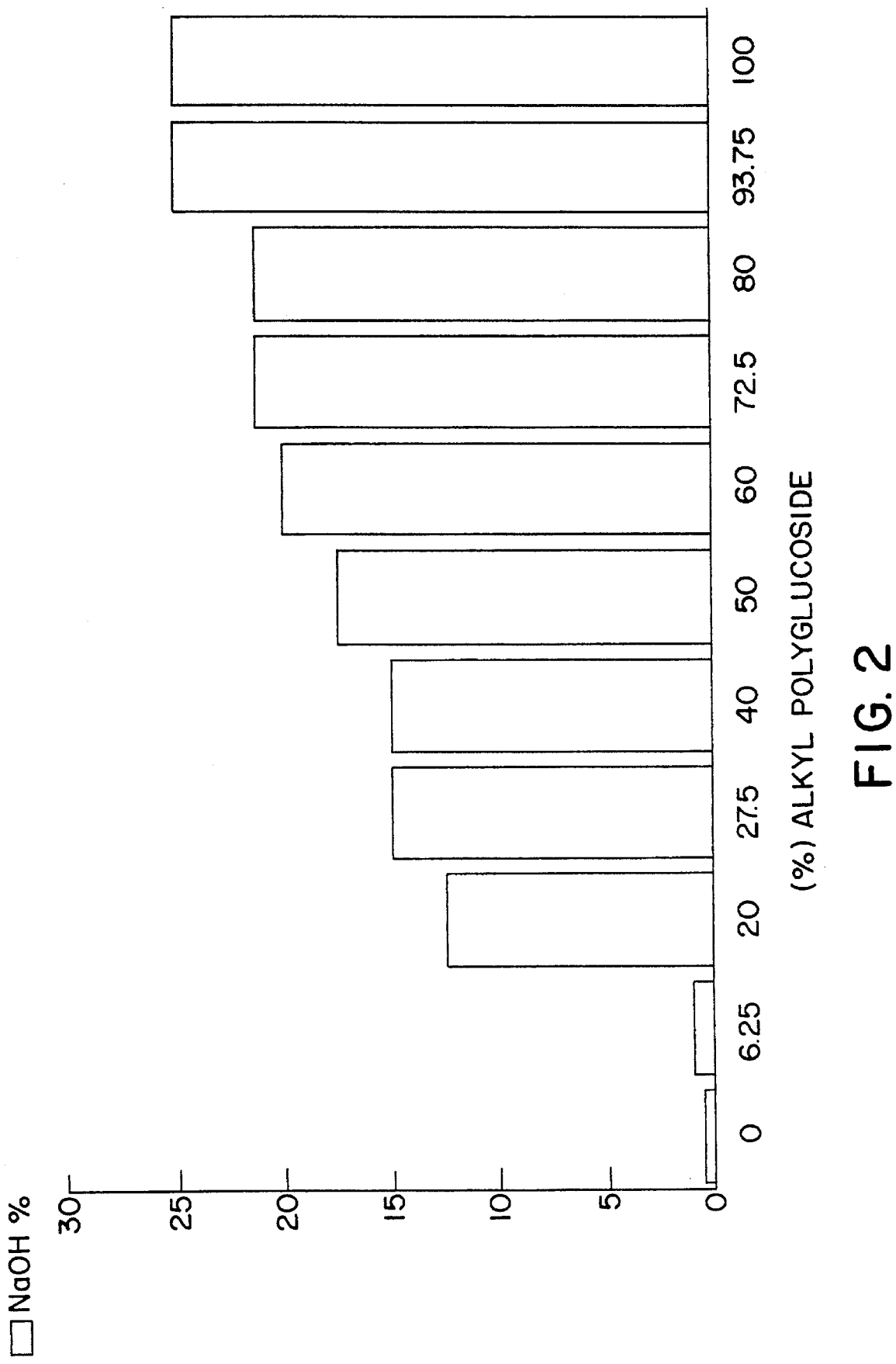
FIG. 2 is a bar graph illustrating the effects of various blends of APG® 600 AND TRYLON® 6735 on caustic stability, represented by sodium hydroxide content, at a temperature of about 160° F.
Figure 3:
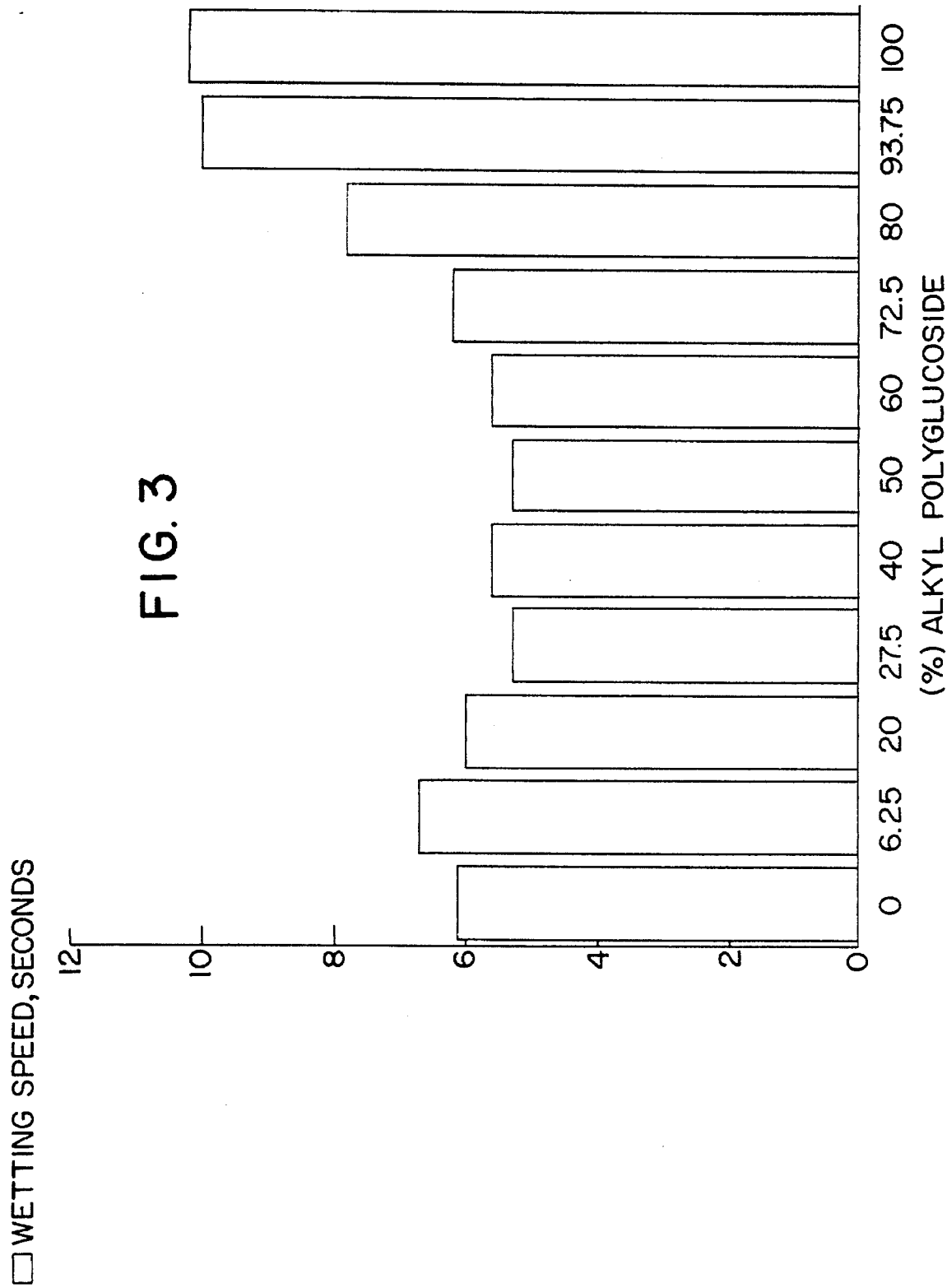
FIG. 3 is a bar graph illustrating the effects of various blends of APG® 600 AND TRYLON® 6735 on Draves wetting speed using a cotton substrate.
Figure 4:
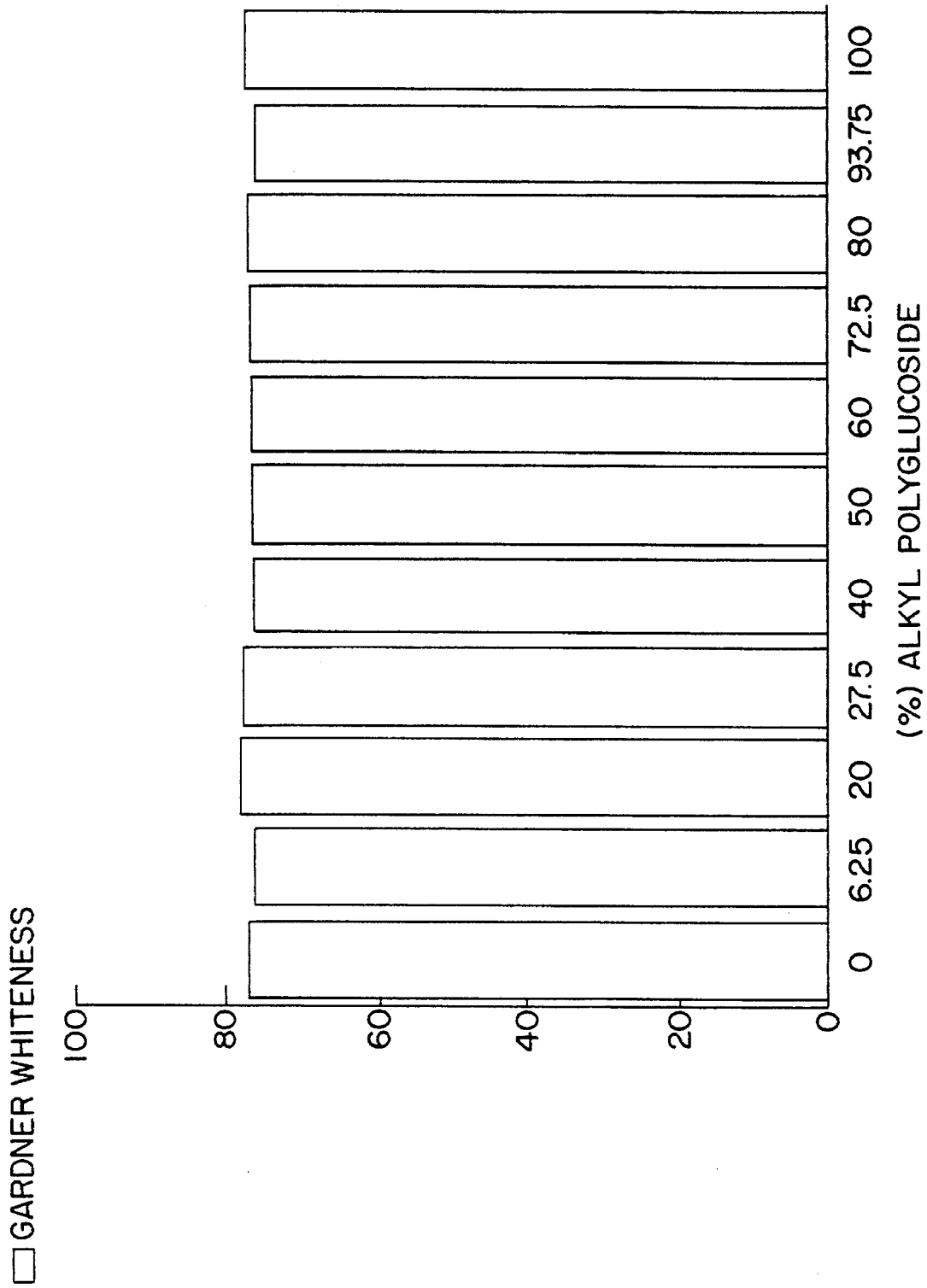
FIG. 4 is a bar graph illustrating the effects of various blends of APG® 600 AND TRYLON® 6735 on bleached whiteness using the Gardner Whiteness test.
Figure 5:
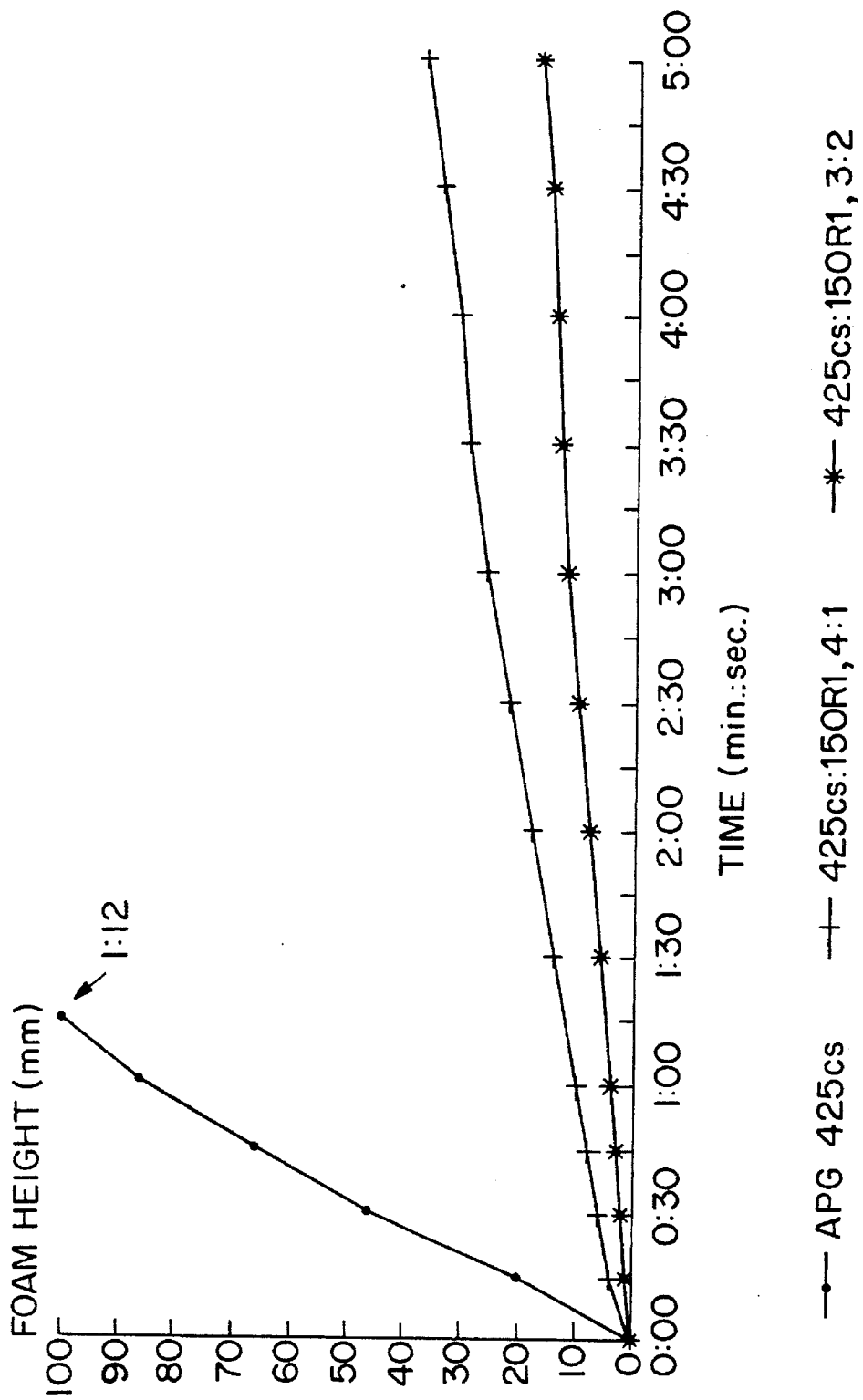
FIG. 5 is a graph of foam height versus time for various weight ratios of APG® 425 surfactant and TETRONIC® 150R1 surfactant.
Figure 6:
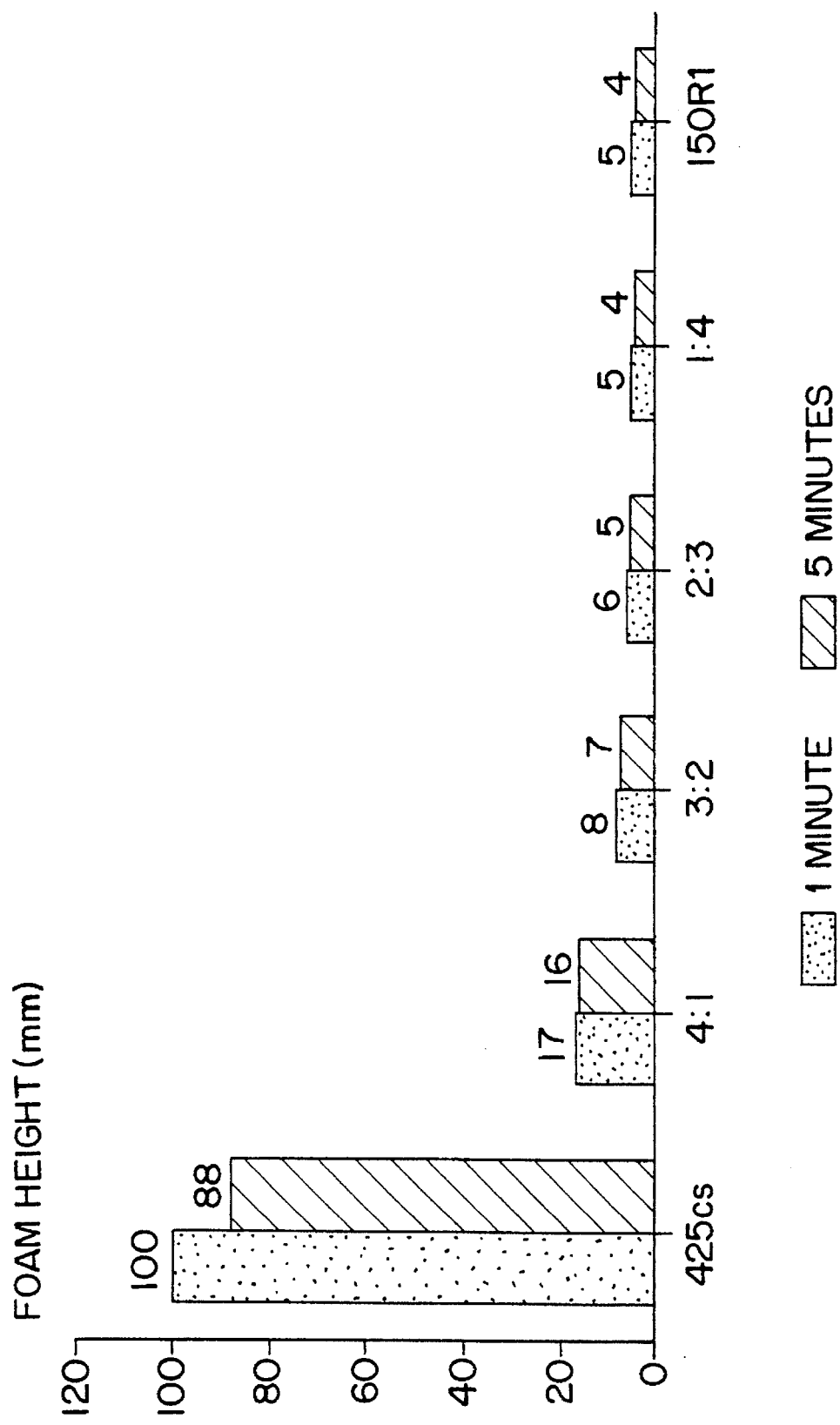
FIG. 6 is a bar graph of foam heights for various weight ratios of APG® 425 surfactant and TETRONIC® 150R1 surfactant for foams generated in a Waring Blender at 25° C. for 1 and 5 minutes.
Figure 7:
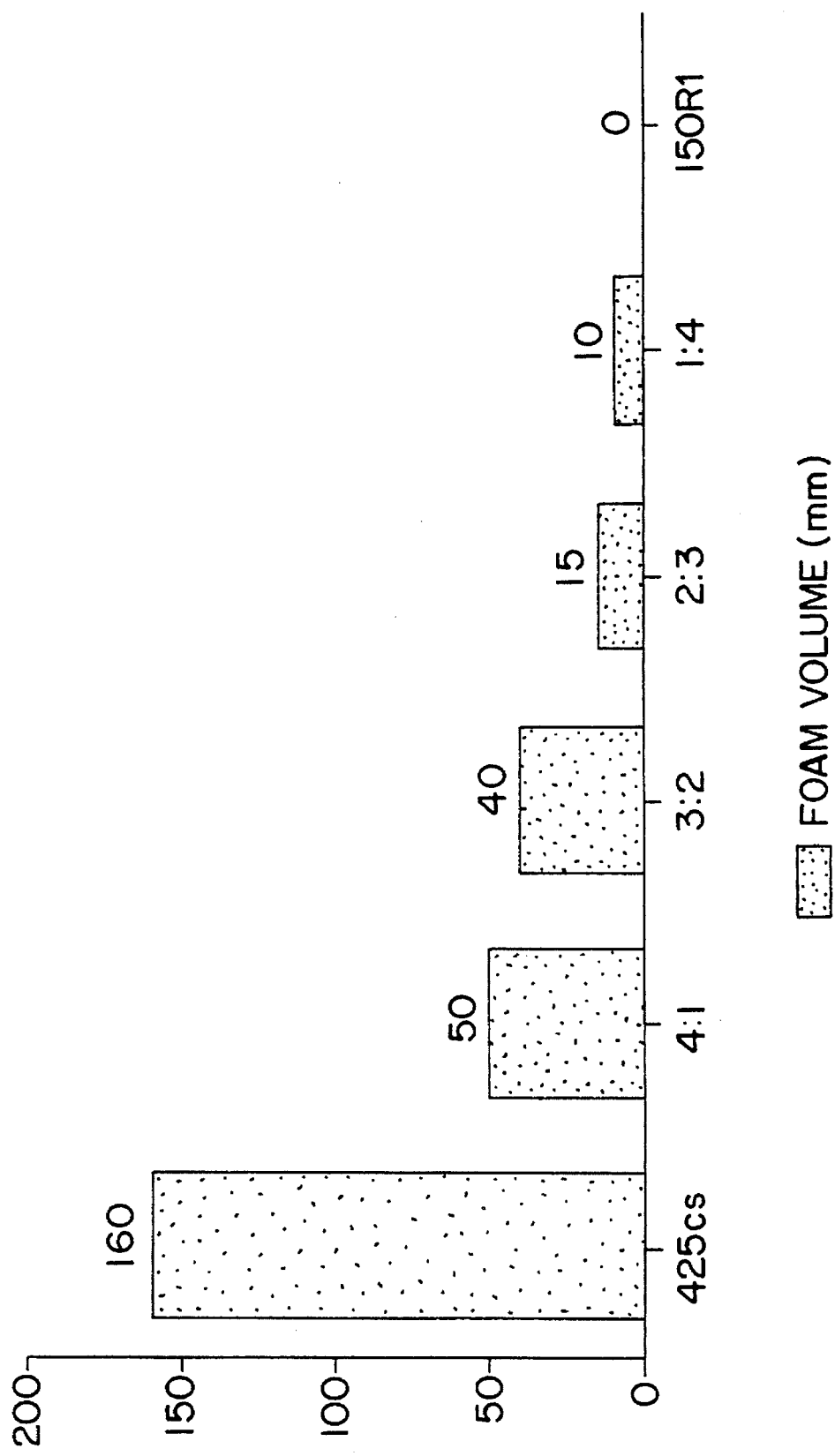
FIG. 7 is a bar graph of foam volume for various weight ratios of APG® 425 surfactant and TETRONIC® 150R1 surfactant in a Modified Inverted Cylinder Test at 25° C.
Figure 8:
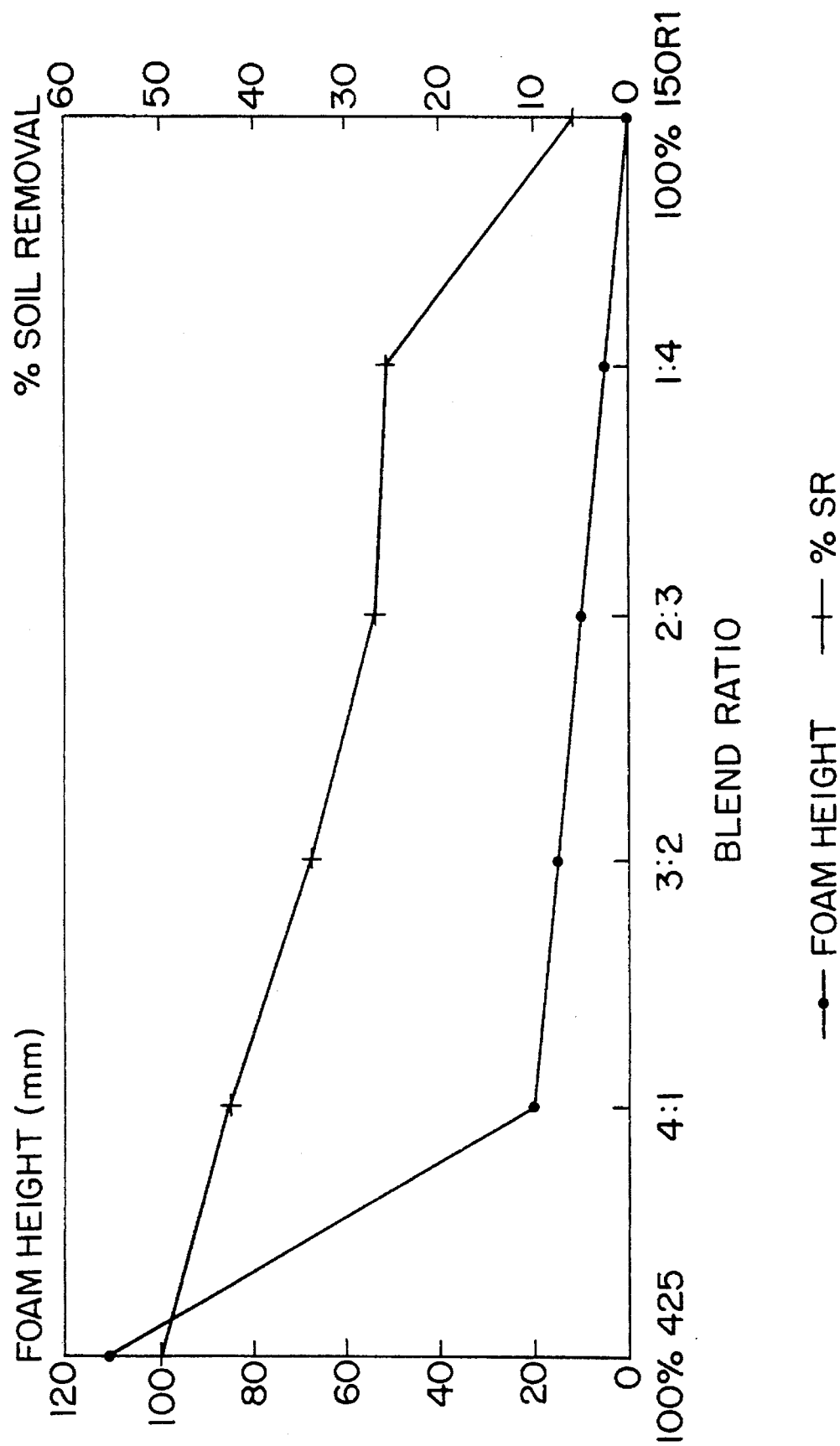
FIG. 8 is a graph of Ross-Miles foam height and % soil removal versus time for various weight ratios of APG® 425 surfactant and TETRONIC® 150R1 surfactant.

It has surprisingly been found that an exceedingly synergistic scouring and bleaching effect can be obtained for a wide variety of textile materials when combining the alkyl polyglycoside surfactant of this invention with a synthetic primary linear $C_8$–$C_{15}$ alcohol that has been alkoxylated.

The aqueous peroxide bleaching bath typically contains finishing components present in an amount of from about 5.0 to about 20.0% by weight, based on weight of the bath. These finishing components include an alkali material, caustic soda, chelating agents and a surface-active material such as a surfactant. It is preferred that the composition be phosphate-free and contain no phenols.

The alkyl polyglycosides which can be used in the compositions and processes according to the invention have the formula I $$R_1O(R_2O)_b(Z)_a \quad I$$

wherein $R_1$ is a monovalent organic radical having from about 6 to about 30 carbon atoms; $R_2$ is divalent alkylene radical having from 2 to 4 carbon atoms; Z is a saccharide residue having 5 or 6 carbon atoms; b is a number having a value from 0 to about 12; a is a number having a value from 1 to about 6. Preferred alkyl polyglycosides which can be used in the compositions according to the invention have the formula I wherein Z is a glucose residue and b is zero. Such alkyl polyglycosides are commercially available, for example, as APG®, GLUCOPON®, or PLANTAREN® surfactants from Henkel Corporation, Ambler, Pa., 19002. Examples of such surfactants include but are not limited to:

1. APG® 225 Surfactant—an alkyl polyglycoside in which the alkyl group contains 8 to 10 carbon atoms and having an average degree of polymerization of 1.7.
2. APG® 425 Surfactant—an alkyl polyglycoside in which the alkyl group contains 8 to 16 carbon atoms and having an average degree of polymerization of 1.6.
3. APG® 625 Surfactant—an alkyl polyglycoside in which the alkyl groups contains 12 to 16 carbon atoms and having an average degree of polymerization of 1.6.
4. APG® 325 Surfactant—an alkyl polyglycoside in which the alkyl groups contains 9 to 11 carbon atoms and having an average degree of polymerization of 1.6.
5. GLUCOPON® 600 Surfactant—an alkyl polyglycoside in which the alkyl groups contains 12 to 16 carbon atoms and having an average degree of polymerization of 1.4.
6. PLANTAREN® 2000 Surfactant—a $C_{8-16}$ alkyl polyglycoside in which the alkyl group contains 8 to 16 carbon atoms and having an average degree of polymerization of 1.4.
7. PLANTAREN® 1300 Surfactant—a $C_{12-16}$ alkyl polyglycoside in which the alkyl groups contains 12 to 16 carbon atoms and having an average degree of polymerization of 1.6.

Other examples include alkyl polyglycoside surfactant compositions which are comprised of mixtures of compounds of formula I wherein Z represents a moiety derived from a reducing saccharide containing 5 or 6 carbon atoms; a is a number having a value from 1 to about 6; b is zero; and $R_1$ is an alkyl radical having from 8 to 20 carbon atoms. The compositions are characterized in that they have increased surfactant properties and an HLB in the range of about 10 to about 16 and a non-Flory distribution of glycosides, which is comprised of a mixture of an alkyl monoglycoside and a mixture of alkyl polyglycosides having varying degrees of polymerization of 2 and higher in progressively decreasing amounts, in which the amount by weight of polyglycoside having a degree of polymerization of 2, or mixtures thereof with the polyglycoside having a degree of polymerization of 3, predominate in relation to the amount of monoglycoside, said composition having an average degree of polymerization of about 1.8 to about 3. Such compositions, also known as peaked alkyl polyglycosides, can be prepared by separation of the monoglycoside from the original reaction mixture of alkyl monoglycoside and alkyl polyglycosides after removal of the alcohol. This separation may be carried out by molecular distillation and normally results in the removal of about 70–95% by weight of the alkyl monoglycosides. After removal of the alkyl monoglycosides, the relative distribution of the various components, mono- and polyglycosides, in the resulting product changes and the concentration in the product of the polyglycosides relative to the monoglycoside increases as well as the concentration of individual polyglycosides to the total, i.e. DP2 and DP3 fractions in relation to the sum of all DP fractions. Such compositions are disclosed in U.S. Pat. No. 5,266,690, the entire contents of which are incorporated herein by reference.

The alkoxylated primary linear alcohols of the present invention are the condensation products of organic $C_8$–$C_{15}$ alcohols with from about 6 to about 7 moles of ethylene oxide and from about 3 to about 6 moles of propylene oxide, per mole of alcohol. These alkoxylated alcohols preferably have an HLB value of from about 7.0 to about 8.5. An example of a commercially available alkoxylated alcohol of this type is TRYLON® 6735, marketed by Henkel Corporation, Textiles Division, Charlotte, N.C.

The amount of alkyl polyglycoside and alkoxylated synthetic alcohol to be used should be sufficient to effectively wet, i.e., impregnate and bleach the textile substrate and thus scour the substrate and improve the bleaching properties of the bath. The types of substrates which will be treated with the bleaching composition will vary, but will include articles of apparel made of cotton and polyester/cotton woven and knit goods.

In a particularly preferred embodiment of the present invention, the composition to be added to the aqueous peroxide bleaching bath contains from about 20 to 60% by weight of the alkyl polyglycoside and from about 80 to 40% by weight of the synthetic alkoxylated linear alcohol. Also, the amount of the scouring and bleaching surfactant composition to be added to the bath is typically in the range from 0.1 to 1.0% by weight, based on the weight of the bath, and preferably from about 0.1 to about 0.2% by weight.

Generally, the continuous scouring and bleaching process for cotton and polyester/cotton woven goods is carried out in two separate steps, and in either rope or open-width form using an exhaust bath..

In the scour step, the pH of the alkaline aqueous impregnation (exhaust) bath is most preferably between about 11 and 12.0 and the temperature of the bath is preferably between about 120° and 200° F., and most preferably about 160° F. The desized fabric is immersed in the alkaline scour bath and squeezed, by pad rolls, to a wet pickup of from about 90 to 110% owg (i.e. on the weight of the goods). The treated fabric is then placed in a steam chamber for about 15 minutes (to simulate the open-width process) or about 60 minutes (to simulate the rope process). The steamed fabric is then washed in water at a temperature from about 180° to 200° F., for about 60 to 90 seconds.

In the bleaching step, the pH of the alkaline aqueous bleaching exhaust bath is preferably between about 10.8 and about 11.2, and most preferably about 11.0. The temperature of the aqueous bath is preferably between about 75° to about 120° F., and most preferably about 100° F. The scoured fabric is then impregnated with the aqueous alkaline bleaching bath in the same manner as in the scouring process above. The treated fabric is then steamed in the same manner as disclosed above for the scouring process. The steamed fabric is then washed in water at a temperature of about 180° to 200° F., for approximately 60 to 90 seconds, followed by a cold rinse in water containing acetic acid to neutralize any residual alkali that may be present. The washed fabric is then dried at about 250° F.

The continuous scouring and bleaching process for cotton and polyester/cotton knit goods may also be performed per the one-bath under liquor method. The pH of the bath is preferably between about 10.8 and 11.2, and most preferably about 11.0. The temperature of the aqueous bath is preferably between about 180° and about 200° F., and most preferably about 185° F. with the dwell time being about 30 to 45 minutes. This step is followed by washing at about 160° to 185° F. for approximately 15 to 20 minutes. It should be noted, however, that the pH and temperature ranges are dependent on a number of variables including the type of substrate being treated.

Another method of applying the aqueous bath is known as a padding operation, i.e., using a padding bath, whereby the bath is padded or blotted onto the substrate. This operation is very similar to that of the continuous dyeing operation since the substrate is mechanically carried into and out of the padding apparatus. When employing the padding bath, the aqueous scouring and/or bleaching bath will have a pH in the range of about 11.0 to 12.0, and preferably in the range of about 10.8 to 11.2. It should be noted, however, that either the exhaust bath or padding bath may be employed to scour and/or bleach the fabric when using the scouring and bleaching surfactant composition in the present invention.

It has also been surprisingly discovered that the foaming tendency of an aqueous alkyl polyglycoside formulation can be significantly reduced by incorporating an effective amount of an ethylene oxide-propylene oxide copolymer of the formula II and/or III as described above into the formulation. Compounds of the formula III are alkoxylated fatty alcohols of the ethylene oxide-propylene oxide block copolymer type. Such compounds are commercially available from, for example, Henkel Corporation, Textiles Division, Charlotte, N.C. as TRYLON® 6735 surfactant. Compounds of the formula II are alkoxylated alkylenepolyamines of the ethylene oxide-propylene oxide block copolymer type. Such compounds are commercially available from, for example, BASF Corp., Performance Chemicals, Parsippany, N.J. 07054, as TETRONIC® 150R1 surfactant and TETRONIC® 901 surfactant. The effective amount of an ethylene oxide-propylene oxide copolymer of the formula II and/or III as described above required to reduce the foam in an aqueous alkyl polyglycoside composition will depend upon the end use of the composition. Typically, the effective amount will be any amount necessary to reduce the foam an aqueous alkyl polyglycoside composition to a desired level and will be readily determinable by the person of ordinary skill in the art. The ethylene oxide-propylene oxide copolymer of the formula II and/or III can be incorporated into an aqueous alkyl polyglycoside composition by any means known to those skilled in the art.

The addition of an ethylene oxide-propylene oxide copolymer of the formula II wherein $R^1$ is —HN—$CH_2CH_2$—NH— and each of k and f is 0; p is 2 and each of b,c, and d is at least 1 into an aqueous alkyl polyglycoside composition reduces the foam without a concomitant reduction in the cleaning ability of the composition. Very effective foam reduction in an aqueous composition comprised of an alkyl polyglycoside in which the alkyl group contains 8 to 10 carbon atoms and having an average degree of polymerization of 1.7 is achieved without a concomitant reduction in the cleaning ability of the composition by adding an equal amount by weight of ethylene diamine alkoxylated with two EO-PO-EO block copolymers which has the formula

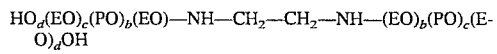
$HO_d(EO)_c(PO)_b(EO)$—NH—$CH_2$—$CH_2$—NH—$(EO)_b(PO)_c(EO)_dOH$ and a molecular weight of about 4,700 Daltons. This compound corresponds to a compound of the formula II wherein $R^1$ is —HN—$CH_2CH_2$—NH— and each of k and f is 0; p is 2 and each of b,c, and d is at least 1 and is commercially available as, for example, TETRONIC® 901 surfactant. Very effective foam reduction in an aqueous composition comprised of an alkyl polyglycoside in which the alkyl group contains 8 to 16 carbon atoms and having an average degree of polymerization of 1.6 is achieved with some concomitant reduction in the cleaning ability of the composition by adding ethylene diamine alkoxylated with two PO-EO-PO block copolymers which has the formula

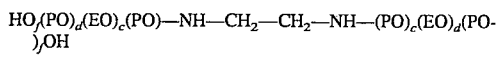

and a molecular weight of about 8,000 Daltons to the alkyl polyglycoside in a block copolymer/alkyl polyglycoside weight ratio of 4/1. This compound corresponds to a compound of the formula II wherein $R^1$ is —HN—$CH_2CH_2$—NH— and each of k and b is 0; p is 2 and each of c, d and f is at least 1 and is commercially available as, for example, TETRONIC® 150 R1 surfactant.

The present invention will be better understood when read in light of the following examples. In the following examples, parts and percentages are by weight and the temperatures are in degrees Celsius.

In the examples, the following five test methods were used to evaluate the effectiveness of the scouring and bleaching composition:
1. Whiteness Measurement:
Procedure (1) Desized, scoured cotton or polyester/cotton woven goods were immersed in the aqueous bleaching and scouring composition and squeezed, by pad rolls, to a wet pickup of 90–110% owg (on the weight of the goods).

(2) The treated fabric was then placed in a steamer for about 15 minutes (to simulate open-width bleach) or 60 minutes (to simulate rope bleach).

(3) The steamed fabric was then washed in water at about 180° to 200° F. for approximately 60 seconds. This washing process was then repeated and followed by a cold rinse in water containing acetic acid to neutralize any residual alkalinity.

(4) The washed fabric was then dried at about 250° F.
Evaluation Method For Whiteness The bleached and scoured fabric was then evaluated using a Gardner Reflectometer to measure whiteness.
2. Foam Measurement:

Bleach baths (see Comparative Examples) were tested for foam propensity using either a scour bath formulation or bleach bath formulation. The test apparatus was a recirculating foam tester that sprays the bath onto the surface of the bath held in the reservoir. For this particular test, the foam measurement was performed using a recirculation pump foam tester at 70 volts, at 120° F. for 60 seconds.
3. Wetting Property Measurement:
Draves Test: Performed using AATCC-17-1989.
4. Cleanliness (% Extractibles):
Performed using: (1) Enzyme and water, and (2) perchloroethylene (AATCC-97-1989).
5. Caustic Stability:
Performed using 10 g/l test sample in 50% caustic soda solution, at 160° F.

EXAMPLE 1

A scouring and bleaching surfactant composition was prepared having the following components:

| COMPONENT | %/wt. |
|---|---|
| (a) TRYLON ® 6735 | 1.25 |
| (b) GLUCOPON ® 600 cs | 37.50 |
| (c) water | 61.25 |
| | 100.00 |

(a) TRYLON® 6735, commercially available from Henkel Corporation, Textiles Division, Charlotte, N.C. is a 12–15 carbon chain length synthetic linear alcohol sold under the trade name NEODOL® 25, available from Shell Oil Co., which is reacted with 5 moles of propylene oxide and 7 moles of ethylene oxide.

(b) GLUCOPON® 600 cs, commercially available from Henkel Corporation, Ambler, Pa., is an alkyl polyglycoside composition having 12 to 16 carbons and an average degree of polymerization of 1.4.

The components listed above and in the following examples were mixed together in a vat at a temperature of about 50° C. under agitation.

EXAMPLE 2

A scouring and bleaching surfactant composition was prepared having the following components:

| COMPONENT | %/wt. |
|---|---|
| (a) TRYLON ® 6735 | 10.0 |
| (b) GLUCOPON ® 600 cs | 20.0 |
| (c) water | 70.0 |
| | 100.0 |

EXAMPLE 3

A scouring and bleaching surfactant composition was prepared having the following components:

| COMPONENT | %/wt. |
|---|---|
| (a) TRYLON ® 6735 | 16.0 |
| (b) GLUCOPON ® 600 cs | 8.0 |
| (c) water | 76.0 |
| | 100.0 |

EXAMPLE 4

A scouring and bleaching surfactant composition was prepared having the following components:

| COMPONENT | %/wt. |
|---|---|
| (a) TRYLON ® 6735 | 36.0 |
| (b) GLUCOPON ® 325 cs | 15.0 |
| (c) water | 49.0 |
| | 100.0 |

(b) GLUCOPON® 325 cs, commercially available from Henkel Corporation, APG Division, is an alkyl polyglycoside composition having 9 to 11 carbon atoms and an average degree of polymerization of 1.6.

EXAMPLE 5

A scouring and bleaching surfactant composition was prepared having the following components:

| COMPONENT | %/wt. |
|---|---|
| (a) TRYLON ® 6735 | 20.0 |
| (b) water | 80.0 |
| | 100.0 |

EXAMPLE 6

A scouring and bleaching surfactant composition was prepared having the following components:

| COMPONENT | %/wt. |
|---|---|
| (a) GLUCOPON ® 600 | 40.0 |
| (b) water | 60.0 |
| | 100.0 |

COMPARATIVE EXAMPLE 1

A scouring and bleaching composition was prepared having the following components:

| COMPONENT | %/wt. |
|---|---|
| (a) SYNTERGENT ® WOR | 0.10 |
| (b) hydrogen peroxide (50%) | 3.00 |
| (c) sodium hydroxide (50%) | 0.35 |
| (d) STANDAPOL ® 617 | 0.20 |
| (e) water | 96.35 |
| | 100.00 |

*STANDAPOL ® 617 is an organic peroxide stabilizer.
*SYNTERGENT ® WOR is a blend of 2-ethyl-hexyl ether phosphate, potassium salt, and TRYLON ® 6735.

EXAMPLES 1–6 AND COMPARATIVE EXAMPLE C1

Examples 1–6 and Comparative Example C1 were used to scour and bleach cotton substrates by impregnation with an aqueous peroxide bleaching bath having a pH of about 11.0, followed by steaming at a temperature of about 98° C. for a period of about 60 minutes.

Each sample was evaluated per the above stated testing methods for whiteness, foam formation, alkali stability, wetting properties and cleanliness, i.e., % Extractibles, the results being set forth in Table I.

TABLE I

| EXAMPLE | FOAM PRODUCED | WHITENESS RATING | DRAVES TEST (sec.) | (%) EXTRACTIBLES | CAUSTIC STABILITY (% of 50% NaOH) |
|---|---|---|---|---|---|
| 1 | very high | 75.9 | 10.0 | 0.06 | 99.0% |
| 2 | high | 76.3 | 5.3 | 0.03 | 70.0% |
| 3 | very low | 77.9 | 6.0 | 0.07 | 50.0% |
| 4 | low | 78.1 | 3.4 | 0.11 | 10.0% |
| 5 | very low | 76.8 | 6.7 | 0.04 | 2.0% |
| 6 | very high | 77.4 | 6.1 | 0.10 | 99.0% |
| C1 | very low | 77.0 | 2.4 | 0.15 | 4.0% |

From the foregoing evaluation results, it can be seen that the bleaching and scouring process of this invention synergistically provides excellent whiteness to fabric materials, low residual impurities, is stable in high concentrations of strongly alkaline materials at high temperatures, is very low-foaming under high agitation conditions, and is biodegradable, thus avoiding pollution concerns.

EXAMPLE 7

The soil removing efficiency of compositions containing alkyl polyglycosides and ethylene oxide-propylene oxide block copolymers of the formula II according to ASTM D-4485-85 using soil A3 and the foam height measured according to ASTM D 1173-53 at 25° C. are shown in Table II. The percent soil removal (% SR), is calculated according to the following equation wherein $Y_s$ is the reflectance value for tiles treated with the indicated treatment solution, $Y_{H_2O}$ is the reflectance value for tiles treated with water, and $Y_0$ is the reflectance value for untreated tiles.

$$\% SR = 100\% \frac{Y_s - Y_{H_2O}}{Y_0 - Y_{H_2O}}$$

DEHYPON® LT104 Surfactant, a trademark product of Henkel Corporation, is a $C_{12-18}$ fatty alcohol ethoxylated with about 10 moles of EO and capped with an n-butyl group. POLYTERGENT® SLF 18, a trademark product of the Olin Corporation, is a low molecular weight alcohol alkoxylated with an EO-PO block copolymer.

TABLE II

| Treatment Solution[a] | Reflectance | % SR | Foam Height[b] |
|---|---|---|---|
| Water | 59.83 | — | — |
| 1 | 77.67 | 52.75 | 135 |
| 2 | 77.36 | 51.83 | 110 |
| 3 | 77.38 | 51.89 | 20 |
| 4 | 82.83 | 66.53 | 20 |
| 5 | 75.14 | 45.23 | 10 |
| 6 | 74.19 | 42.47 | 20 |
| Unsoiled | 93.65 | — | — |

[a]1-0.6% GLUCOPON ® 225 Surfactant in water
2-0.6% GLUCOPON ® 600 Surfactant in water
3-0.3% GLUCOPON ® 225 Surfactant + 0.3% DEHYPON ® LT104 Surfactant in water.
4-0.3% GLUCOPON ® 225 Surfactant + 0.3% TETRONIC ® 901 in water
5-0.3% GLUCOPON ® 225 Surfactant + 0.3% POLYTERGENT ® SLF 18 in water
6-0.32% GLUCOPON ® 600 Surfactant + 0.16% GLUCOPON ® 225 Surfactant + 0.12% TETRONIC ® 150R1 in water.
[b]Foam Height in mm according to ASTM D 1173-53 at 25° C.

What is claimed is:

1. A process of reducing foam in an aqueous alkyl polyglycoside composition comprising adding to said composition an effective amount of an ethylene oxide-propylene oxide copolymer of the formula II $$R^1[(EO)_b(PO)_c(EO)_d(PO)_f]_p \qquad (II)$$

wherein $R^1$ is an ethylenepolyamino group of the formula

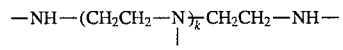

and wherein each of b and f is 0 or a number having a value of at least 1, and each of c and d is a number having a value of at least 1, with the proviso that when f is 0, b is at least 1 and when b is 0, f is at least 1; p is an integer from 2 to 5; and k is an integer from 0 to 3 and EO is —$CH_2CH_2$—O— and PO is —$CH_2 CH(CH_3)$—O—.

2. A process as in claim 1 wherein $R^1$ is —NH—$CH_2 CH_2$—NH—; f is 0; each of b,c, and d is at least 1; and p is 2.

3. A process as in claim 1 wherein $R^1$ is —NH—$CH_2 CH_2$—NH—; b is 0; each of c, d, and f is at least 1; and p is 2.

* * * * *